United States Patent [19]

Cerny et al.

[11] Patent Number: 5,298,894
[45] Date of Patent: Mar. 29, 1994

[54] UTILITY METER TRANSPONDER/ANTENNA ASSEMBLY FOR UNDERGROUND INSTALLATIONS

[75] Inventors: David L. Cerny; Brenda Stewart, both of Milwaukee; Lee Karsten, Thiensville; H. Paul Walding, Jr., West Bend; Joseph A. Ziino, Wales, all of Wis.

[73] Assignee: Badger Meter, Inc., Milwaukee, Wis.

[21] Appl. No.: 900,220

[22] Filed: Jun. 17, 1992

[51] Int. Cl.⁵ ............... G08B 23/00; H01Q 1/04
[52] U.S. Cl. ............... 340/870.02; 340/870.01; 343/719; 343/872; 324/74
[58] Field of Search ............... 340/870.02, 870.01, 340/825.54; 343/719, 872, 873; 342/51, 156; 324/74

[56] References Cited

U.S. PATENT DOCUMENTS

| | | |
|---|---|---|
| 1,781,280 | 11/1930 | Haase et al. |
| 3,475,755 | 10/1969 | Bassen et al. |
| 3,641,576 | 2/1972 | Farbanish ............... 343/743 |
| 3,729,727 | 4/1973 | Young et al. |
| 3,913,400 | 10/1975 | Floren ............... 73/273 |
| 4,230,234 | 10/1980 | Taylor ............... 220/18 |
| 4,316,194 | 2/1982 | DeSantis et al. ............... 342/846 |
| 4,463,354 | 7/1984 | Sears ............... 340/870.02 |
| 4,491,792 | 1/1985 | Bullock et al. ............... 324/157 |
| 4,518,965 | 5/1985 | Hidaka ............... 343/742 |
| 4,520,423 | 5/1985 | Sutherland ............... 361/380 |
| 4,633,262 | 12/1986 | Traut ............... 343/785 |
| 4,638,314 | 1/1987 | Keller ............... 340/870.02 |
| 4,758,836 | 7/1988 | Scuilli ............... 340/870.31 |
| 4,801,944 | 1/1989 | Madnick et al. ............... 343/744 |
| 4,847,626 | 7/1989 | Kahler et al. ............... 343/741 |
| 4,868,566 | 9/1989 | Strobel et al. ............... 340/870.3 |
| 4,998,102 | 3/1991 | Wyler et al. ............... 340/870.02 |

FOREIGN PATENT DOCUMENTS 0252184  1/1988  European Pat. Off. .

OTHER PUBLICATIONS

Badger Meter Catalog, G-101, Jan. 1990 "The Trace Radio Frequency Meter Reading System".

*Primary Examiner*—Donnie L. Crosland
*Attorney, Agent, or Firm*—Quarles & Brady

[57] ABSTRACT

A remote meter reading arrangement in which utility consumption data accumulated in an electronic metering unit located within an underground enclosure is transmitted via radio frequency signals to a handheld data collection unit or to a mobile data collection unit carried in a vehicle. An assembly for installation in the underground enclosure includes an antenna enclosure, a transponder enclosure and means for enclosing and protecting an antenna within the antenna enclosure and a transponder within the transponder enclosure. Two embodiments are disclosed.

6 Claims, 5 Drawing Sheets

UTILITY METER TRANSPONDER/ANTENNA ASSEMBLY FOR UNDERGROUND INSTALLATIONS

BACKGROUND OF THE INVENTION

1. Field of the Invention

The invention relates to the remote reading of utility meters which are located outside of a building in an underground enclosure.

2. Description of the Background Art

In moderate climate zones, utility meters are located in subsurface enclosures in areas adjacent to residences or other dwellings. Such enclosures are referred to as "pits." An example of such enclosure is illustrated in Haase et al., U.S. Pat. No. 1,781,280.

In Edwards et al., EPO Publication No. 0 252 184, meter data is transmitted from a utility meter in an underground pit to an electronic collection unit carried by a meter reading person. Scuilli, U.S. Pat. No. 4,758,836, shows an electronic metering unit which uses the inductive coupling method of the metering unit of Edwards et al.

More specifically, the electronic metering unit in Edwards et al. is electrically connected through a cable to a first inductive coil, which is positioned in an assembly that attaches to the pit lid. A second coil is located in the tip of a wand carried by a meter reading person. The meter reading person positions the tip of the wand in an opening in the pit lid assembly. This permits the coupling of signals by which the meter data is transmitted from the electronic meter to the collection unit.

There are a number of limitations in the prior art. First, the inductive coupling system does not provide a completely remote system as the meter reading person must approach relatively close to the pit lid to obtain a reading. Second, underground equipment must be made weather-resistant to varying temperature and moisture conditions. This is particularly true of electronic equipment to be used in underground enclosures.

The assembly for the inductive coupling system discussed above was not sealed against the elements. There was one opening for communication with the pit to allow a connection of a connecting cable and a second opening at the top to allow coupling to the second inductive coil.

Radio frequency meter reading systems have been known, but such prior radio frequency systems have been limited in use to buildings and above ground installations because the components were not sufficiently weather-resistant for use in underground pit enclosures.

Another limitation is that pit enclosures, being typically made of metal, present possible interference with radio transmission and reception.

The present invention is intended to overcome the limitations of the prior art.

SUMMARY OF THE INVENTION

The invention is incorporated in an assembly comprising a completely enclosed, low profile, antenna housing which attaches to the lid of a subsurface pit enclosure, an antenna disposed within the antenna housing and projecting above the pit lid for transmitting radio signals to a collection unit, a transponder enclosure within the pit, a transponder within the transponder enclosure for converting data signals received from an electronic utility meter to radio frequency signals for transmission through the antenna, and a sealed connection between the antenna enclosure and the transponder enclosure.

In a preferred embodiment the antenna enclosure and transponder enclosure are coupled together, a first seal is used to seal the transponder enclosure, and a second seal is used to seal the connection of the antenna enclosure to the transponder enclosure.

In an alternative embodiment, a separate antenna enclosure is connected to a transponder enclosure by a cable with a sealed entry into each enclosure.

The invention provides a fully remote meter reading system with weather-resistant features that permit installation of units in outdoor underground enclosures.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

DETAILED DESCRIPTION OF THE PREFERRED EMBODIMENT

Figure 1:
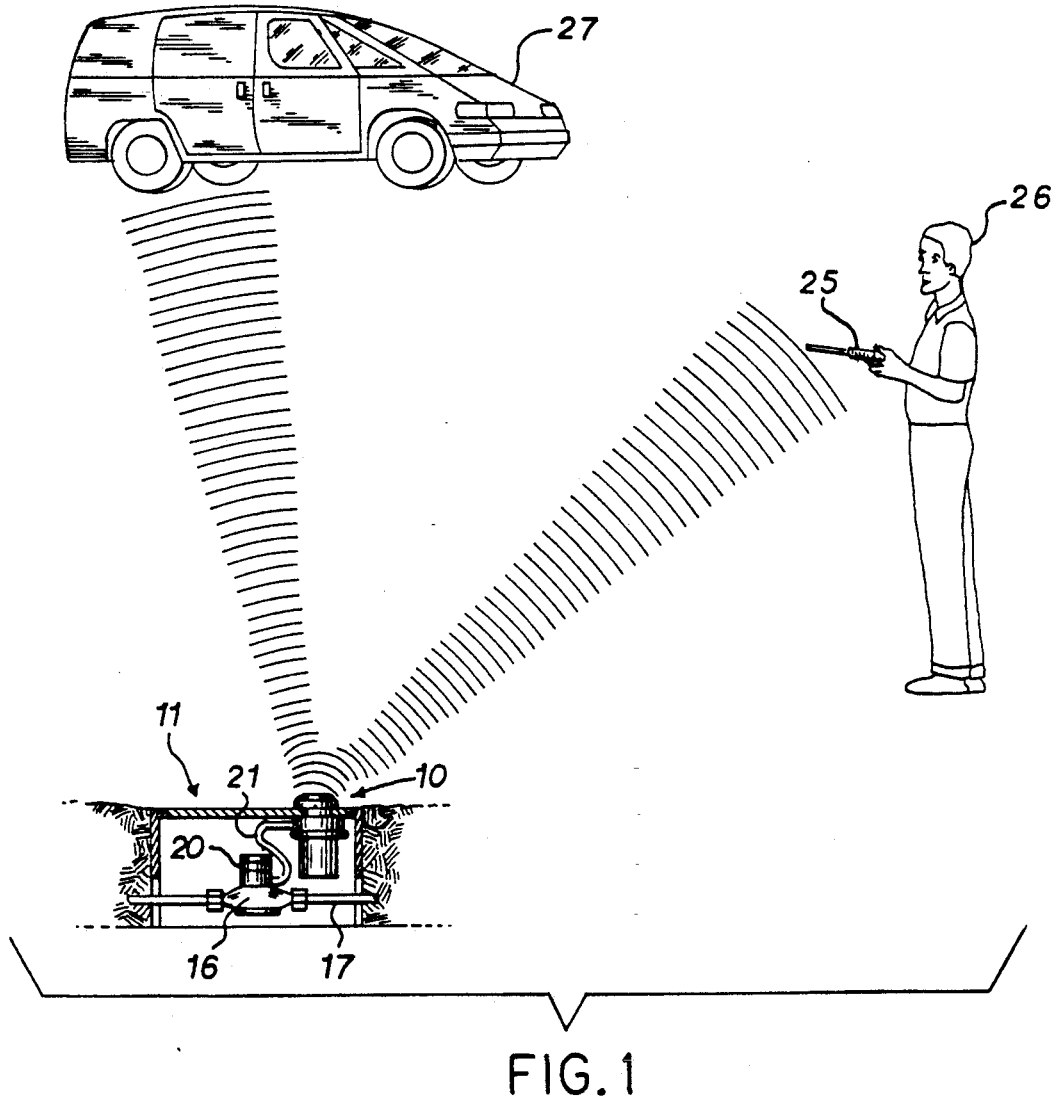
FIG. 1 is a general pictorial illustration showing the environment of the present invention.
Figure 2:
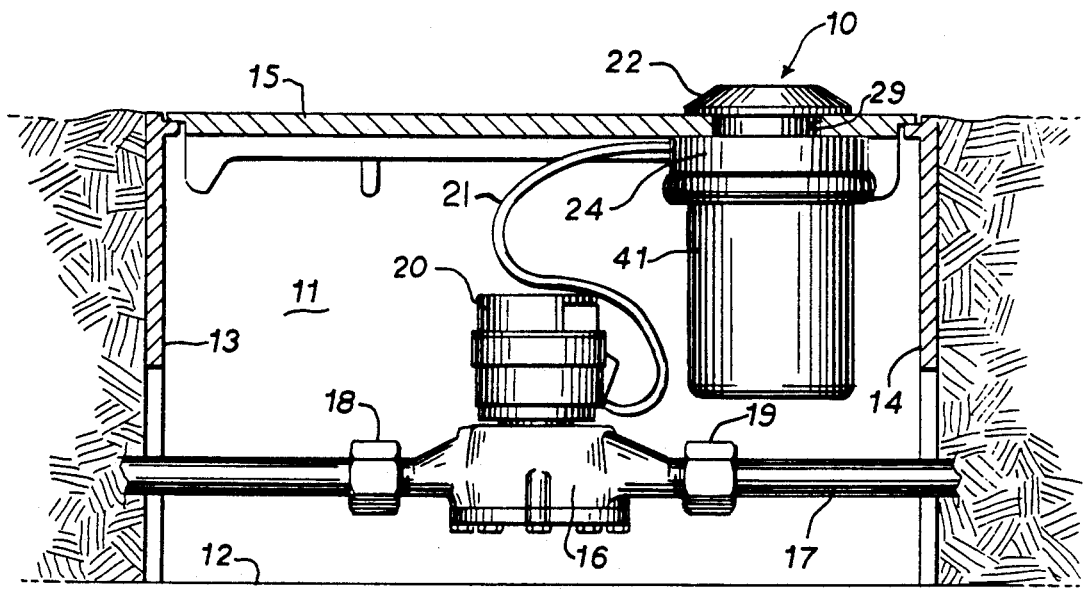
FIG. 2 is a side view in elevation of a preferred embodiment of an assembly of the present invention.

Referring to FIGS. 1 and 2, the invention is incorporated in a pit transponder and antenna assembly 10 located in a subsurface pit enclosure 11. The pit is typically made of metal and includes sidewalls 13, 14 and a lid 15 which is removable to open the enclosure for access. A bottom wall 12 is optional. The pit enclosure 11 is located along the route of water supply pipe 17. A water meter housing 16 is connected in the water supply line 17, using hex-head nuts 18, 19 which are sealed in a conventional manner against leaks at the connecting points. An electronic water meter unit 20 is mounted on top of the housing 16. The electronic meter 20 is preferably a meter including the High Resolution Transmitter offered by Badger Meter, Inc., the assignee of the present invention. This transmitter is described in Strobel et al., U.S. Pat. No. 4,868,566, entitled "Flexible Piezoelectric Switch Activated Metering Pulse Generators."

Figure 4:
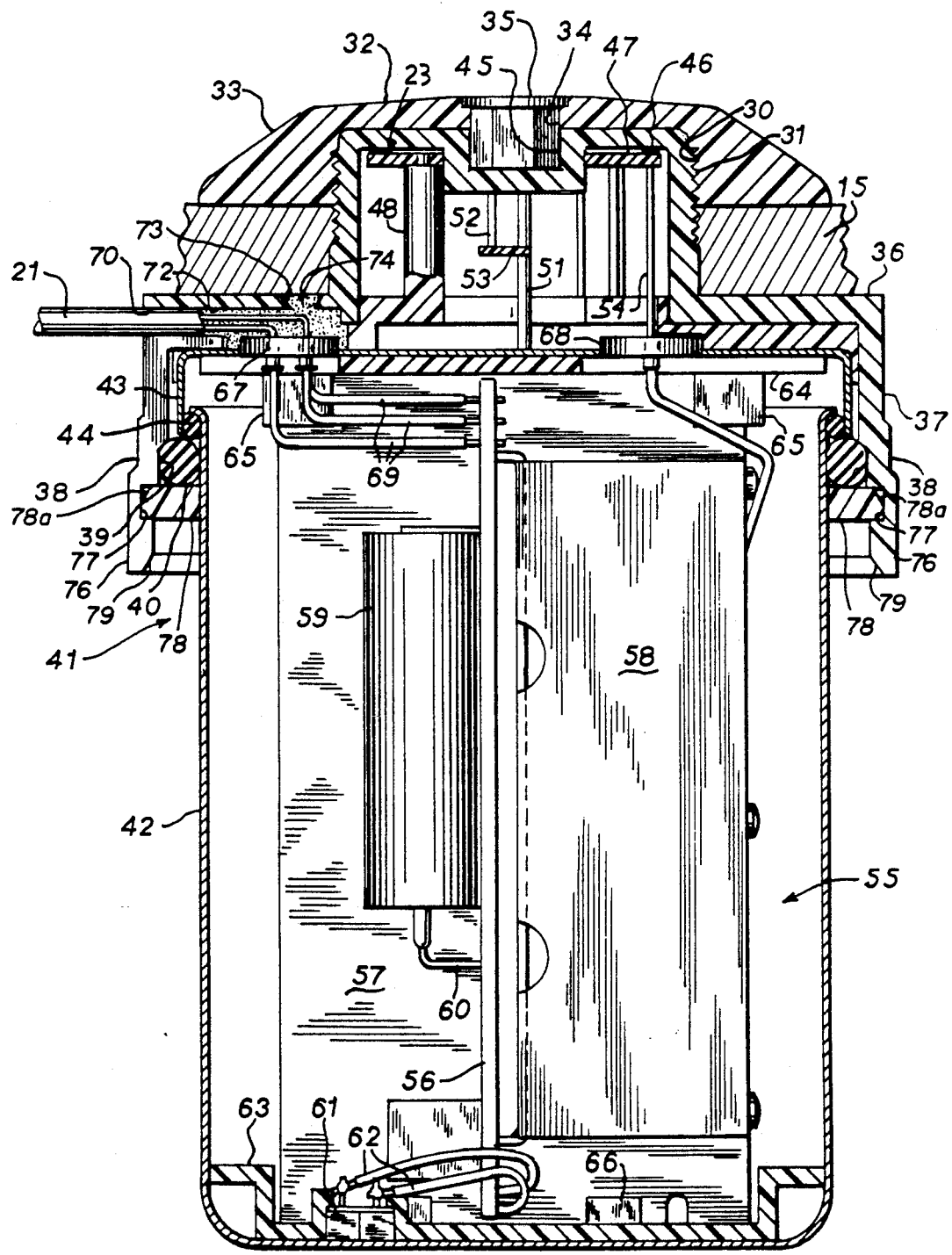
FIG. 4 is sectional view of the assembly of FIG. 2.

The water meter 20 connects via a twisted pair, shielded cable 21 to the transponder and antenna assembly 10, which in this embodiment is attached to, and hangs down from the pit lid 15. A cap 22 is positioned above the pit lid 15, and as seen in FIG. 4, an antenna 23 is positioned within an antenna shroud 24 to extend above the pit lid 15. The cap 22 is made of plastic and antenna shroud 24 is made of an ABS polycarbonate blend plastic, so as not to interfere with radio waves which emanate into the atmosphere.

As seen in FIG. 1, the transponder/antenna assembly 10 communicates via radio waves with a handheld collection unit 25 carried by a meter reading person 26 or a collection unit carried in a vehicle 27. The collection unit 25 sends interrogation signals to each transponder/antenna assembly 10 (representing a customer meter) in the form of a digitally encoded message with a unique identification number and an error code for checking the data at the receiving end. In response to this message, the transponder/antenna assembly 10 transmits a return message which includes an identification code, meter reading data, and an error code for checking the data at the receiving end.

The handheld collection unit 25 has a range of approximately 50 feet and has storage for up to 1,000 readings. The collection unit (not seen) in vehicle 27 has a range of 150 feet and can process and store up to 1,800 readings per minute.

Figure 3:
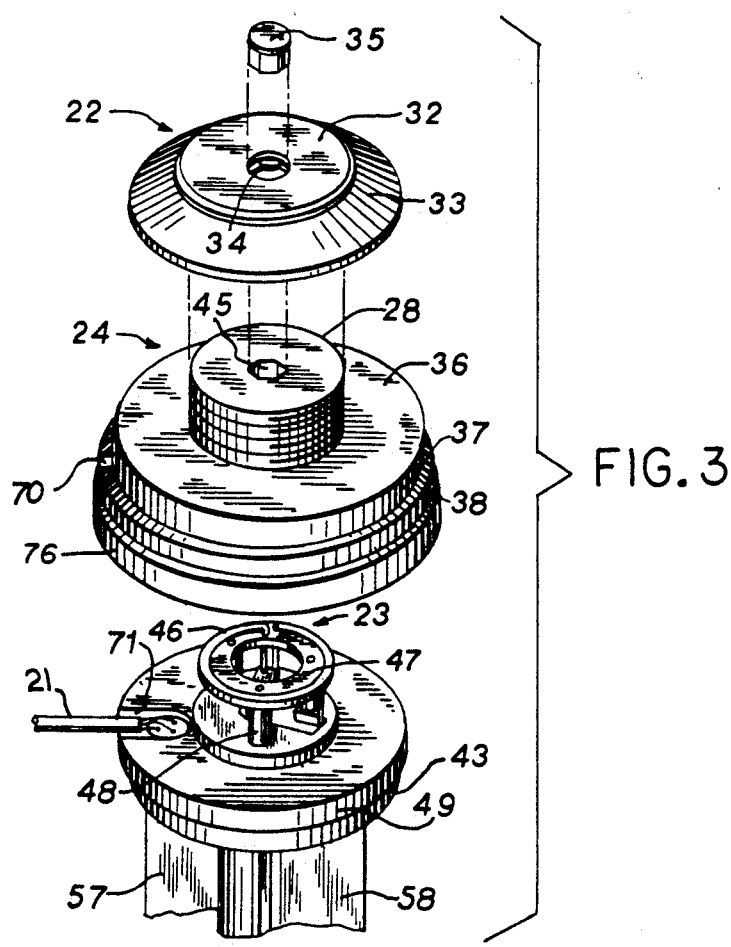
FIG. 3 is a exploded perspective view of the top portion of the assembly of FIG. 2.

Referring to FIGS. 2, 3 and 4 the antenna shroud 24 has a threaded stem 28 with a lower end and an upper end. When the transponder/antenna assembly 10 is installed, the threaded stem 28 extends through a hole 29 in the pit lid 15 in FIG. 2. The cap 22 has a circular opening with an inside circumferential thread 30 that engages the thread 31 on the stem 28 as seen in FIG. 4. The cap 22 is screwed onto the threaded stem 28 and has a flat bottom side which engages a top side of the pit lid 15 to suspend the transponder/antenna assembly 10 from the pit lid 15. The top side of the cap 22 has a central portion 32 with a slightly curved profile as seen in FIG. 4 and a bevel portion 33 seen in FIGS. 3 and 4 which runs around the central portion and extends outward to the outer rim. The cap 22 also has a hexagonal opening 34 through the center to receive a hex-sided anti-tamper plug 35. Stem 28 includes hex socket 45 to receive plug 35.

As seen in FIG. 3, the antenna shroud 24 has a circular flange portion 36 extending laterally from a lower end of the stem 28. As seen in FIG. 4, this flange 36 portion engages an underside of the pit lid 15 to trap a portion of the pit lid 15 between it and the underside of the cap 22. A circumferential rim 37 extends downwardly from the flange portion. The rim 37 has a first portion 38 of slightly enlarged diameter. On the inside of the rim 37 opposite that portion 38 is a race 39 for receiving an O-ring 40 which seals a space between the antenna shroud 24 and a transponder housing 41.

The rim 37 has a second portion 76 of still further enlarged diameter depending from portion 38. Inside that second portion 76 is a groove 77 with two right angle corners. A ring 78 of the same material as the shroud 24 is snapped into groove 77 through a gap formed by the space between portion 76 and transponder housing 41. A tapered inside edge portion 79 of portion 76 assists assembly. Snap ring 78 has a beveled, upper outside edge 78a to aid assembly. When the snap ring 78 is in place in FIG. 4, an air pocket is created to help prevent intrusion of moisture into the transponder housing 41.

The transponder housing 41 includes a stainless steel, seamless can body 42 with an open end that is covered by a copper lid 43. The upper rim of the can body 42 curves outward slightly to retain a second O-ring 44 of smaller diameter than O-ring 40. This second O-ring 44 is installed between a rim of the lid 43 and the rim of the can body 42 to seal the transponder housing 41.

The antenna shroud 24 encloses the top of a loop antenna 23 formed by a copper trace 46 seen in FIG. 3, disposed on a ring-shaped substrate 47 of material typically used in circuit boards. A coating (not shown) is applied over the copper trace 46 and substrate 47 for protection against moisture. The substrate 47 is supported on three legs 48 extending upward from, and molded as part of, the antenna base 49. It should be noticed in FIG. 4 that the copper trace 46 is positioned above the pit lid 15 when the transponder/antenna assembly 10 is attached to the pit lid 15. The antenna base 49 is made of plastic and fits over the copper lid 43 as seen in FIG. 3.

Referring to FIGS. 3 and 4, the copper loop 46 has one end connected by a first rigid metal lead 51 to the can lid 15, which serves as an electrical ground plane. The copper loop 46 has an opposite end connected by a second rigid metal lead 52 to a capacitor plate 53 which is held in suspension above the ground plane 15 to provide a capacitor element with an air dielectric. A third lead is provided by a wire 54 running from a point intermediate the ends of the loop 46 to an electronic transponder 55 in a transponder housing 41 below. The transponder 55 is mounted on and includes a circuit board 56 within the transponder housing 41. The circuit board 56 stands at a right angle to, and has one edge attached to, a metal plate 57 which further forms one side of a metal enclosure 58 for certain of the transponder components. Batteries 59 are mounted on a back side of this circuit board 56 opposite the other transponder components to provide an internal power source. The batteries 59 are electrically connected by wires 60 to the transponder circuitry. Reed switches 61 are electrically connected by wires 62 to the transponder circuit to provide an option for reprogramming when the switches are actuated by an external magnet. The transponder 55 is a part purchased from American Meter Company. It includes the electronic components necessary to carry out the conversion of signals from the automatic meter reading device 20 to the radio frequency signals which are transmitted to the antenna 23 and there converted to radio waves.

The metal plate 57 to which the transponder is attached stands between two plastic molded brackets 63, 64, one inside the top lid 43 of the transponder housing 41 and the other resting on the inside bottom of the transponder housing 41. The brackets have slotted guides 65, 66 for receiving the top and bottom edges of the metal plate 57 as seen in FIG. 4.

The top lid 43 has two entry ports which are covered by elements referred to as headers 67, 68. The wire from transponder 55 to the antenna 23 passes through small holes in one header 68. A twisted pair, shielded cable 21 runs from the electronic meter reading device 20 to the transponder 55 and has three insulated leads 69 which pass through holes in the second header 67 into the interior of the transponder housing 41, where the wire ends are stripped and soldered to the circuitry on circuit board 56.

There is an opening 70 through the side of the rim 37 of the antenna shroud 24 and there is a radially inward directed slot 71 in the flange of the antenna base 49, as seen in FIG. 3, which forms a wire entry channel 72 to receive the wire 21 from the meter 20, as seen in FIG. 4. A port 73, seen in FIG. 4, is provided in the flange 36 for admission of adhesive 74 into the wire entry channel from above the slot 71 in the antenna base 49. The wire 21 is inserted and connected as shown in FIG. 4 and then a room temperature vulcanizing adhesive/sealant 74, preferably that known under the trade name General Electric RTV-160, is admitted through the port 73 until it fills the wire entry channel. The adhesive 74 is cured to seal the wire entry channel 72.

The resulting antenna/transponder assembly 10 is completely sealed. The transponder 55 is completely enclosed and sealed in the transponder housing 41. The antenna 23 is completely enclosed and sealed in an antenna housing formed by the shroud 24 being sealed over the top of the transponder housing 41 by the larger diameter O-ring 40. This effects a double seal for the transponder 55.

Figure 5:
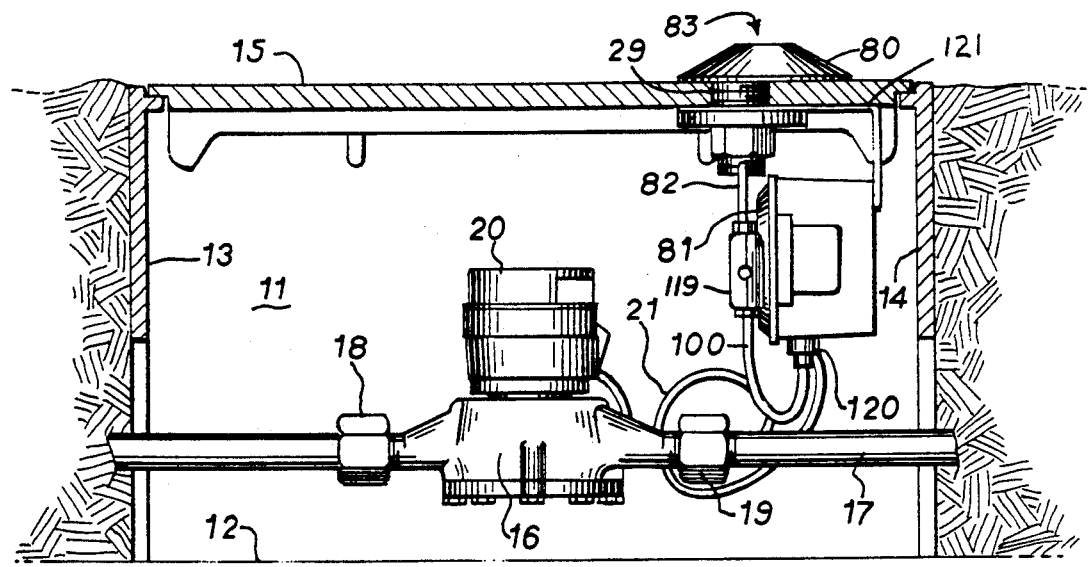
FIG. 5 is a side view in elevation of an alternative embodiment of the present invention.
Figure 6:
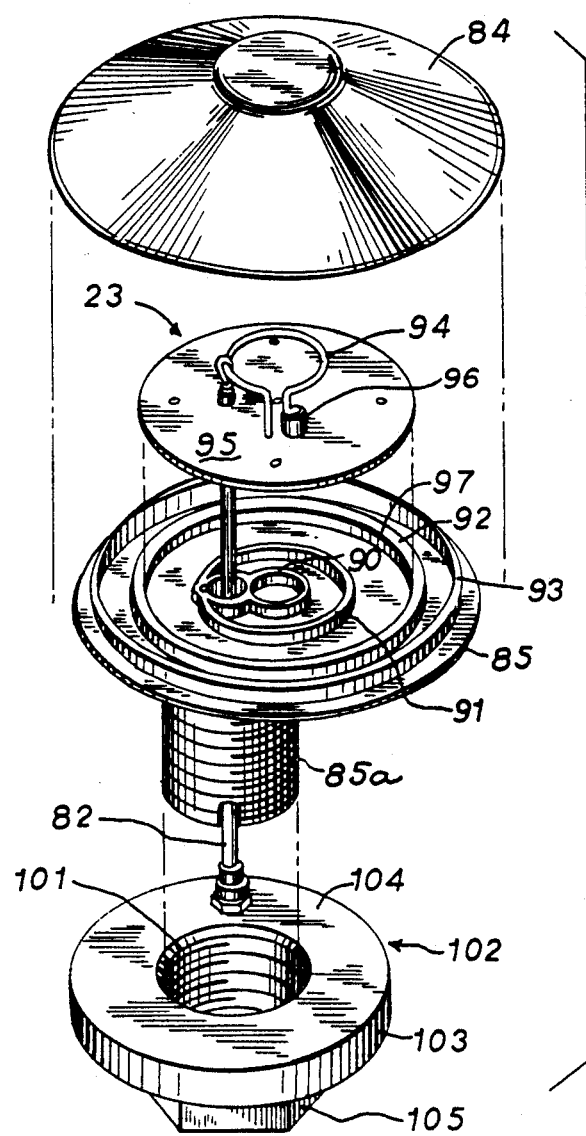
FIG. 6 is a exploded perspective view of the antenna enclosure of FIG. 5.
Figure 7:
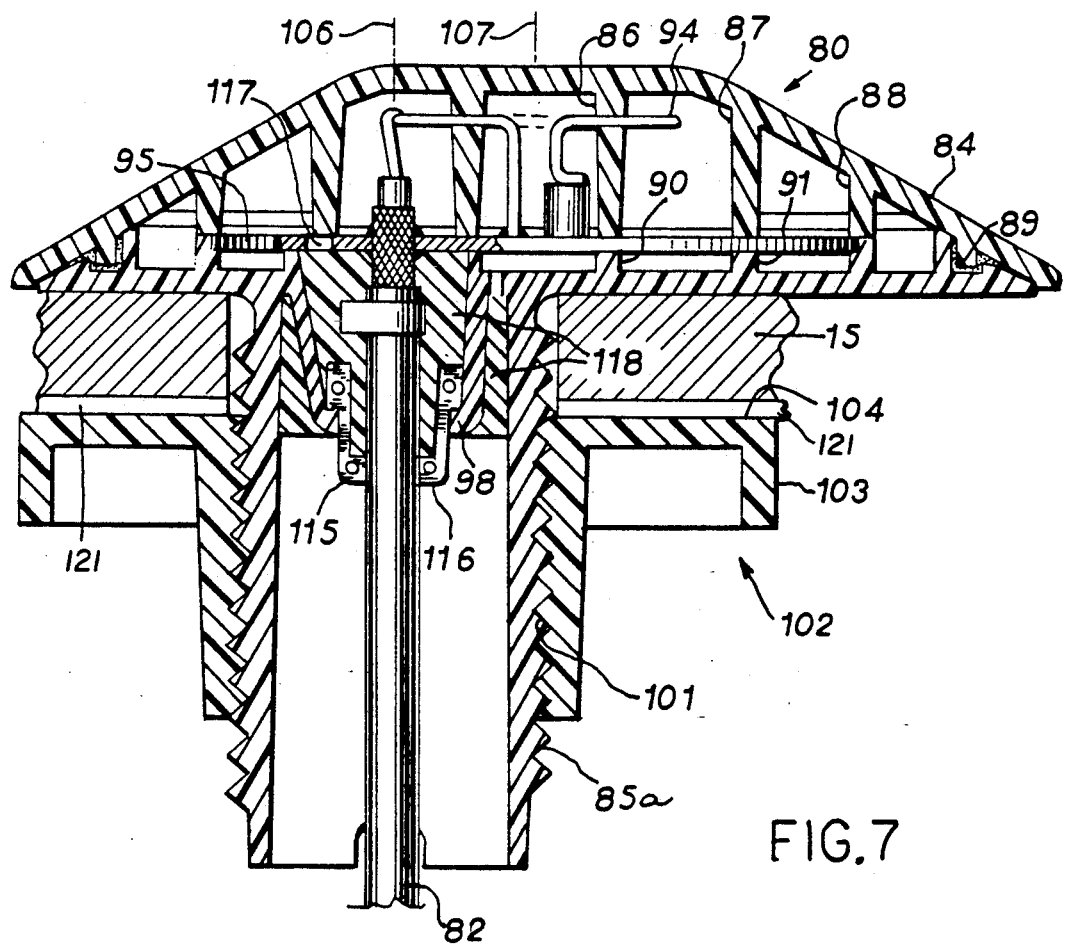
FIG. 7 is a sectional view of the antenna enclosure of FIG. 5.

In an alternative embodiment shown in FIGS. 5, 6 and 7, the antenna 23 and transponder 55 are enclosed in separate housings 80, 81, both made of plastic. The transponder housing 81 may be coated on the inside or outside to make the housing 81 more moisture resistant. Electronic meter unit 20 connects via twisted pair cable 21 to the transponder unit 81 and the transponder unit 81 connects via a coaxial, shielded cable 82 to the antenna assembly 80.

Figure 8:
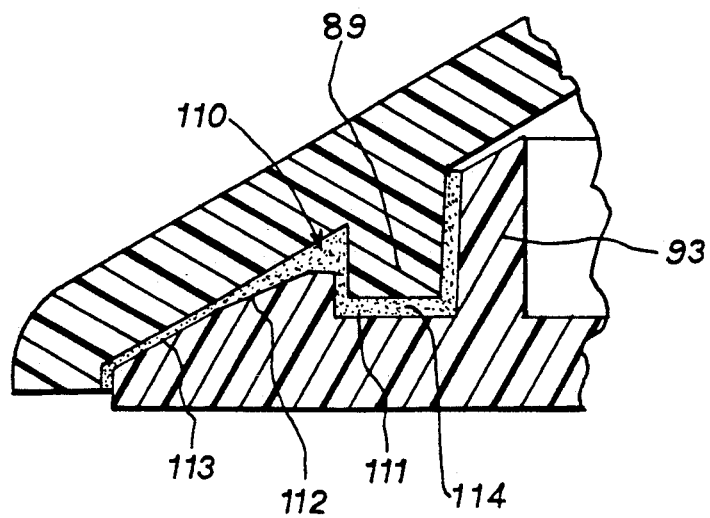
FIG. 8 is an enlarged detail view of a portion of FIG. 7.

As seen in FIGS. 6 and 7, the antenna assembly 23 is enclosed within a plastic cap 83 having a cover 84 separable from a base piece 85. A threaded stem 85a is integrally formed with base piece 85 and depends therefrom. The cover 84 is an inverted saucer shape and has ring-shaped vertical walls 86-89. As seen in FIG. 8, the cover 84 is connected and sealed to the base piece 85 by applying a urethane adhesive 110, preferably Ciba-Geigy Uralane 5754 two-part polyurethane, in the channel 111 of base piece 85 and by placing ring-shaped vertical wall 89 into channel 111. The support wall 93 will aid in the direction of adhesive displacement over surfaces 112 and 113 of the base piece to provide a proper adhesive bond between these parts. The adhesive remaining in the tongue and groove joint 114 forms a seal between the cover and the base piece 85.

The antenna is formed by a metal wire 94 bent in the shape of an open-ended loop with one end bent downward and connected to the ground plane 95 and the other end connecting to a capacitor element 96 having its other side connected to the ground plane 95. One ring shaped wall 92 on the base piece 85 forms a seat 97 which receives the circular metal ground plane 95 for the antenna. When installed in the antenna housing, the antenna 94 is situated above the pit lid 15 as seen in FIG. 7.

Figure 5A:
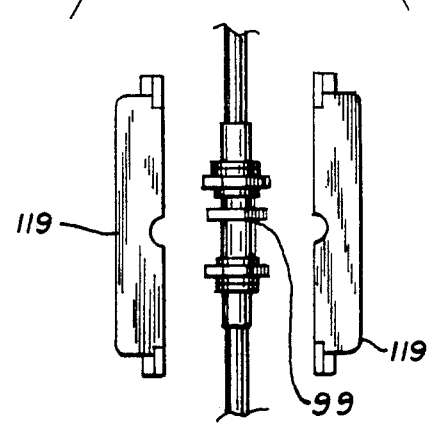
FIG. 5a is an enlarged detail view of a portion of FIG. 5.

Intermediate its ends, the antenna loop 94 is connected to a stripped end of a coaxial, shielded cable 82. The cable 82 runs down through an opening formed in two half cylindrical pieces 115, 116 projecting through an opening in a plug-shaped portion 98 of the base which closes the opening from the interior of the pit into the antenna housing 80. Adhesive 118 is introduced through port 117 in ground plane 95 into the interior of of portion 98 and pieces 115, 116. The adhesive fills the cavity and is allowed to cure. The cable 82 connects through pod 119 to a cable 100 running to the transponder housing 81. The potting pod 119 is placed over a connector 99 as seen in FIG. 5a, which connects the ends of cables 82 and 100. A room temperature vulcanizing adhesive/sealant is admitted into the pod 119 to seal the connection from the pit environment. In a similar fashion, two semi-cylindrical pieces 120 are used to seal the entry of cable 100 into the transponder housing 81. The transponder shown in FIG. 4 is suitable for use in the housing 80 of FIG. 5.

The central axis 106 of the cylindrical stem 86 is disposed off-center from the central axis 107 of the cap 83. The stem 85a is threaded around its outside to engage threads 101 on the inside of a stem of a collar piece 102. The collar piece 102 includes an annular flange 104 and a depending rim 103. When the collar 102 is installed as part of the antenna housing, the annular flange 104 contacts the underside of the pit lid 15 and clamps the spaced apart legs of U-shaped bracket 121 as seen in FIG. 5. The stem 85a extends down beyond the rim 103 and has flats 105 formed on it to provide a hex-nut portion that aids in attaching and tightening the collar piece 102 to the cap 84, 85.

This has been a description of two examples of how the invention can be carried out. Those of ordinary skill in the art will recognize that various details may be modified in arriving at other detailed embodiments, and these embodiments will come within the scope of the invention, as defined by the following claims.

Therefore, to apprise the public of the scope of the invention and the embodiments covered by the invention, the following claims are made.

We claim:

1. An assembly for radio frequency communication of data between a utility meter within a subsurface pit enclosure and a collection unit, the pit enclosure having a pit lid with a hole therein and the assembly comprising:

an antenna enclosure having a cap including a stem with a lower end and with an upper end, the stem extending through the hole in the pit lid and the cap closing completely the upper end of the stem and being supported by a top side of the pit lid to suspend the stem in the hole;

means around the lower end of the stem for clamping against an underside of the pit lid to trap a portion of the pit lid between said means and the cap;

an antenna disposed within the antenna enclosure and projecting above the pit lid for transmitting radio signals to the collection unit;

a transponder enclosure within the pit;

a transponder completely enclosed within the transponder enclosure for converting data signals received from the meter to radio frequency signals for transmission through the antenna;

means for electrically connecting the transponder to the antenna; and means for sealing and enclosing the antenna enclosure and the transponder enclosure against the environment within the pit enclosure.

2. The assembly of claim 1, wherein the transponder further comprises a seamless cylindrical can of corrosion-resistant metal in which the transponder is mounted, the can having an open end; and a metal lid which encloses the open end of the can; and wherein the means for sealing includes (i) means for sealing the metal lid over the open end of the can to complete a sealed enclosure for the transponder; and (ii) means for sealing the antenna enclosure over the means for sealing the metal lid of the transponder enclosure to double seal the transponder enclosure.

3. The assembly of claim 1, wherein the means for sealing the metal lid includes an O-ring.

4. The assembly of claim 1, wherein the means for sealing the antenna enclosure over the means for sealing the metal lid of the transponder enclosure includes a second O-ring and a plastic snap ring.

5. The assembly of claim 1, wherein the means encircling the lower end of the threaded stem of the antenna forms a wire entry channel with an opening on one side to receive a wire from the meter and also forms a port for admission of adhesive into the wire entry channel from above; and wherein the transponder enclosure includes a wire entry port from the interior of the antenna enclosure to an interior of the transponder enclosure;

wherein a wire from the utility meter is positioned in the wire entry channel and passes through the wire entry port into the transponder enclosure; and and further comprising adhesive filling a portion the wire entry channel not occupied by the wire to seal the wire entry into the transponder enclosure.

6. The assembly of claim 1, wherein the transponder enclosure is located in the pit separate and apart from the antenna enclosure.

* * * * *